(12) United States Patent
Pellon et al.

(10) Patent No.: US 7,190,561 B2
(45) Date of Patent: Mar. 13, 2007

(54) APPARATUS FOR DETECTING ARC FAULTS

(75) Inventors: Christian V. Pellon, Norton, MA (US); Mark D. Rabiner, Cambridge, MA (US); Michael Parker, Camarillo, CA (US); Christopher A. Nicolls, North Attleboro, MA (US); Keith W. Kawate, Attleboro Falls, MA (US); Robert Zanelli, Rehoboth, MA (US); Roger D. Mayer, Attleboro, MA (US); Lucien Fontaine, Lincoln, RI (US); Michael J. Lavado, Griswold, CT (US); Lynwald Edmunds, Mansfield, MA (US); Jeffrey B. Ting, Boston, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 217 days.

(21) Appl. No.: 10/937,486

(22) Filed: Sep. 9, 2004

(65) Prior Publication Data

US 2006/0050447 A1    Mar. 9, 2006

(51) Int. Cl.
*H02H 3/00*    (2006.01)
(52) U.S. Cl. .......................... 361/5; 360/648
(58) Field of Classification Search .................. 361/50, 361/5
See application file for complete search history.

(56) References Cited

U.S. PATENT DOCUMENTS

| | | | |
|---|---|---|---|
| 4,694,402 A | 9/1987 | McEachern et al. | 702/71 |
| 5,229,651 A | 7/1993 | Baxter, Jr. et al. | 307/66 |
| 5,452,223 A | 9/1995 | Zuercher et al. | 702/58 |
| 6,137,418 A * | 10/2000 | Zuercher et al. | 340/648 |
| 6,373,257 B1 * | 4/2002 | Macbeth et al. | 324/536 |
| 6,577,138 B2 * | 6/2003 | Zuercher et al. | 324/536 |

OTHER PUBLICATIONS

Copending U.S. Appl. No. 10/314,715, filed Dec. 9, 2002 Inventor(s): Keith W. Kawate, Christian V. Pellon Title: Arc Detection Apparatus and Method.

* cited by examiner

*Primary Examiner*—Robert L. Deberadinis
*Assistant Examiner*—Luis E. Román
(74) *Attorney, Agent, or Firm*—Russell E. Baumann

(57) ABSTRACT

An apparatus and method for detecting arc faults that have reduced susceptibility to nuisance tripping. The apparatus includes a current sensor, an input sense circuit, an arcing sense circuit, a power supply, a tripping (firing) circuit, a processor, and an electromechanical interface. The current sensor monitors a power input comprising an AC current, and provides high frequency components of the. AC current to the input sense circuit. The input sense circuit filters and rectifies the AC signal, and provides the rectified signal to the arcing sense circuit. The arcing sense circuit provides a voltage level accumulated over a predetermined time period, and digital signals indicative of possible electrical arcing occurring during the sampling period, to the processor. The processor measures the voltage level, stores information relating to measured voltages and the digital signals, and processes the stored information using one or more algorithms, thereby determining whether the signals resulted from an arc fault or a nuisance load. In the event the signals resulted from an arc fault, the processor activates the firing circuit to trip the electromechanical interface, thereby interrupting the power output to the load.

16 Claims, 14 Drawing Sheets

|  | Oldest Data |  |  | Newest Data | Pulse Counter Active? |
| --- | --- | --- | --- | --- | --- |
| 0x0 | 0 | 0 | 0 | 0 | Y |
| 0x1 | 0 | 0 | 0 | k | N |
| 0x2 | 0 | 0 | k | 0 | N |
| 0x3 | 0 | 0 | k | k | Y |
| 0x4 | 0 | k | 0 | 0 | N |
| 0x5 | 0 | k | 0 | k | Y |
| 0x6 | 0 | k | k | 0 | N |
| 0x7 | 0 | k | k | k | Y |
| 0x8 | k | 0 | 0 | 0 | Y |
| 0x9 | k | 0 | 0 | k | N |
| 0xA | k | 0 | k | 0 | Y |
| 0xB | k | 0 | k | k | N |
| 0xC | k | k | 0 | 0 | Y |
| 0xD | k | k | 0 | k | N |
| 0xE | k | k | k | 0 | Y |
| 0xF | k | k | k | k | Y |

ANY OTHER COMBINATIONS: PULSE COUNTER = N
e.g. [0 0 j k]

Legend:
    0 = Zero Pulses during AC half-cycle
    k = a "k" number of pulses during AC half-cycle
    j = a "j" number of pulses different from "k" in AC half-cycle
    Y = Pulse Counter Active
    N = Pulse Counter Inactive

*Fig. 6*

APPARATUS FOR DETECTING ARC FAULTS

CROSS REFERENCE TO RELATED APPLICATIONS

Copending application Ser. No. 10/314,715, filed Dec. 9, 2002 and application Ser. No. 10/937,487 filed of even date and assigned to the assignee of the present invention contain subject matter similar to that contained herein.

STATEMENT REGARDING FEDERALLY SPONSORED RESEARCH OR DEVELOPMENT

N/A

BACKGROUND OF THE INVENTION

The present application relates generally to apparatus and methods for detecting arc faults, and more specifically to arc fault detection apparatus and methods that are less susceptible to nuisance tripping.

Arc fault detection apparatus and methods are known that employ a micro-controller to measure voltages associated with a load, and to process data representing the voltage measurements to determine the presence of electrical arcing. For example, a conventional arc fault detection apparatus may be configured to sense an alternating load current, to filter and rectify the AC signal, and to provide the rectified signal to an integrating capacitor. The conventional arc fault detection apparatus may then use a micro-controller to take measurements of the voltage across the integrating capacitor, and to convert the voltage measurements to digital data for subsequent processing by an algorithm. For example, the algorithm may be employed to analyze the measured voltage levels corresponding to respective cycles of the line voltage, and to determine whether the voltage measurements are characteristic of electrical arc faults or nuisance loads such as dimmer loads, appliance thermostat switching, drill current transitions, random line voltage spikes, and/or EMI bursts. In the event the voltage measurements are characteristic of an arc fault, the conventional arc fault detection apparatus typically trips a circuit breaker to disconnect the power line from the circuit.

Although the above-described conventional arc fault detection apparatus has been successfully employed to detect and distinguish between electrical arcing and nuisance loads, there is a need for arc fault detection techniques that have increased reliability. For example, due to the generally chaotic nature of electrical arcing, arc faults typically produce varying numbers of arcing events per half cycle of the line voltage. In contrast, nuisance loads, e.g., triac-controlled dimmer circuits, typically produce the same number of arcing events per half cycle, and may therefore produce arcing events periodically over multiple half cycles. However, conventional arc fault detection apparatus often cannot reliably distinguish between periodic and non-period arcing events, and are therefore prone to nuisance tripping. Moreover, such conventional apparatus frequently have difficulty distinguishing between certain start-up and shutdown conditions and electrical arcing. In addition, although some loads may produce noisy switching signals having relatively large voltage levels, such signals are not necessarily indicative of electrical arcing and may be incorrectly characterized as arc faults by conventional arc fault detection apparatus.

It would therefore be desirable to have improved arc fault detection apparatus and methods that avoid the drawbacks of the above-described conventional apparatus and methods.

BRIEF SUMMARY OF THE INVENTION

In accordance with the present invention, an apparatus and method for detecting arc faults are provided that have reduced susceptibility to nuisance tripping. In one embodiment, the arc fault detection apparatus includes a current sensor, an input sense circuit, an arcing sense circuit, a power supply, a tripping (firing) circuit, a processing unit, and an electromechanical interface. In one mode of operation, the current sensor monitors a Power Input comprising an alternating current (AC), and provides high frequency components of the AC current to the input sense circuit. Next, the input sense circuit filters and rectifies the AC signal at its input, and provides the rectified signal to the arcing sense circuit. The arcing sense circuit then provides a voltage level accumulated over a predetermined sampling period, and one or more digital signals indicative of possible electrical arcing occurring during the sampling period, to the processing unit. The processing unit is operative to measure the voltage level, to store information relating to measured voltages and the digital signals provided thereto, and to process the stored information using one or more algorithms, thereby determining whether the signals resulted from an arc fault or a nuisance load. In the event the signals resulted from an arc fault, the processing unit activates the firing circuit to trip the electromechanical interface, thereby interrupting the Power Output to the load.

In the presently disclosed embodiment, the micro-controller executes a plurality of algorithms for distinguishing between arc faults and nuisance loads, including a three cycle algorithm (TCA) operative to determine voltage fluctuations that cancel disturbances caused by nuisance loads of the type that are repetitive or continuously varying. The TCA may be expressed as $$TCA = |(|V_{[n-1]} - V_{[n]}| + |V_{[n+1]} - V_{[n]}| - |V_{[n+1]} - V_{[n-1]}|)|,$$

in which $V[n-1]$ represents a first voltage measurement corresponding to a first cycle of the line voltage, $V[n]$ represents a second voltage measurement corresponding to a second cycle of the line voltage, and $V[n+1]$ represents a third voltage measurement corresponding to a third cycle of the line voltage. The plurality of algorithms further include a first pulse counter algorithm for counting the number of arcing events occurring during each half cycle of the line voltage, a second pulse counter algorithm for capturing timing information relating to one or more arcing events, and an arcing event counter algorithm for counting the number of arcing events included in at least one running sum of voltage measurements. By executing one or more algorithms to distinguish between arc faults and nuisance loads, the arc fault detection apparatus can detect arc faults with increased reliability, thereby reducing the susceptibility of the apparatus to nuisance tripping.

Other features, functions, and aspects of the invention will be evident from the Detailed Description of the Invention that follows.

BRIEF DESCRIPTION OF THE SEVERAL VIEWS OF THE DRAWINGS

The invention will be more fully understood with reference to the following Detailed Description of the Invention in conjunction with the drawings of which:

FIG. 1b is a schematic diagram illustrating the arc fault detection apparatus of FIG. 1a;

FIGS. 2a–2b are diagrams illustrating transformer configurations that may be employed in the arc fault detection apparatus of FIG. 1a;

FIGS. 3a–3b are schematic diagrams illustrating sum of logarithm circuits that may be employed in the arc fault detection apparatus of FIG. 1a;

FIG. 3c–3d are schematic diagrams illustrating comparator circuits that may be employed in the arc fault detection apparatus of FIG. 1a;

FIG. 4 is a flow diagram illustrating a method of operation including a three cycle algorithm performed by the arc fault detection apparatus of FIG. 1a;

FIGS. 5a–5b are flow diagrams illustrating pulse counter algorithms performed by the arc fault detection apparatus of FIG. 1a;

FIG. 6 is a table illustrating the mapping of measurement data sets employed by the pulse counter algorithms of FIGS. 5a–5b;

FIG. 7 is a flow diagram illustrating an arcing event counter algorithm performed by the arc fault detection apparatus of FIG. 1a;

FIG. 8 is a flow diagram illustrating a method of integrating the output of a comparator circuit using a digital counter performed by the arc fault detection apparatus of FIG. 1a; and FIG. 9 is a flow diagram illustrating a method of operation including the pulse counter algorithm of FIGS. 5a–5b, the three cycle algorithm of FIG. 4, and the arcing event counter algorithm of FIG. 7 performed by the arc fault detection apparatus of FIG. 1a.

DETAILED DESCRIPTION OF THE INVENTION

Figure 1A:
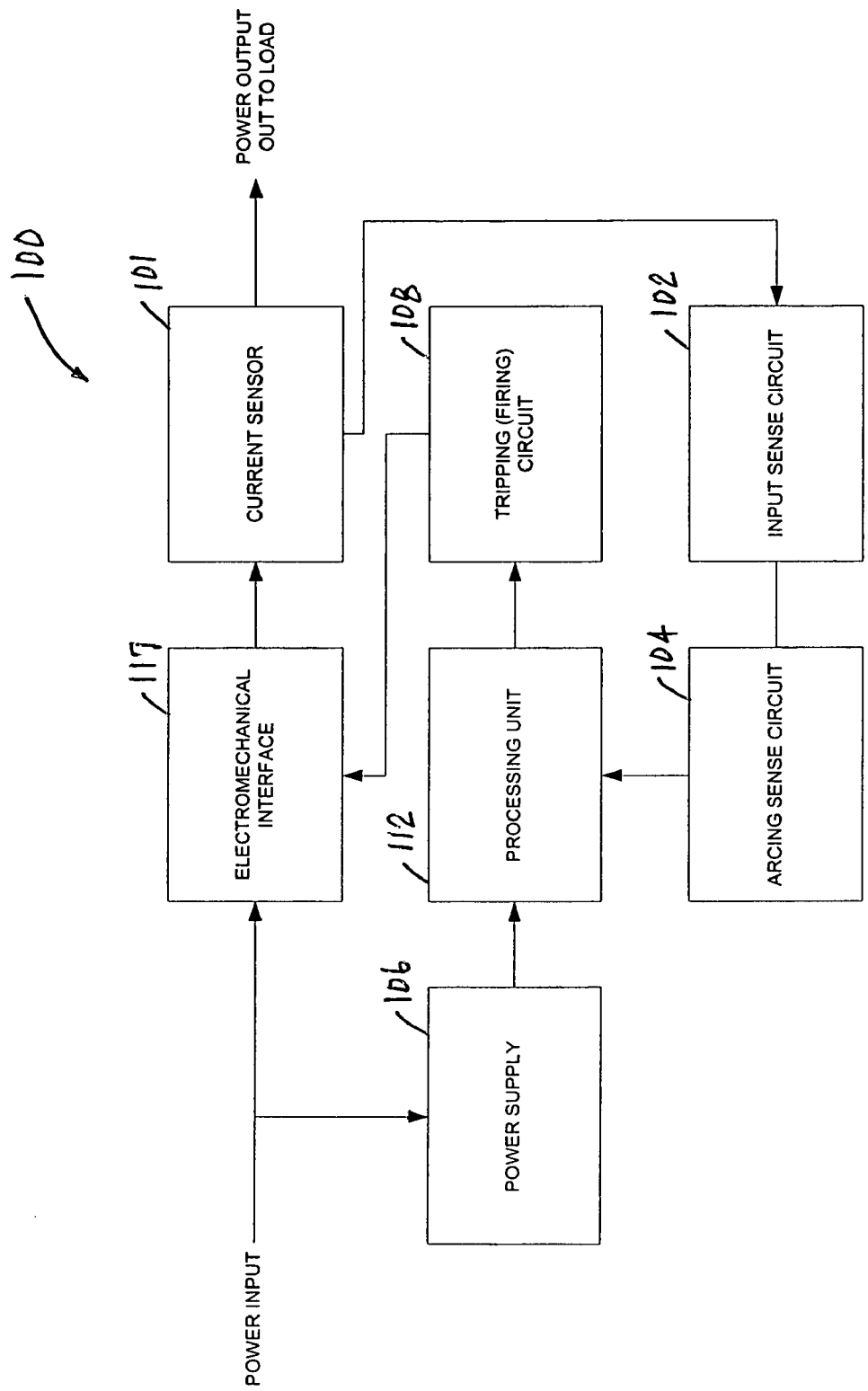
FIG. 1a is a block diagram of an arc fault detection apparatus according to the present invention.

FIG. 1a depicts an illustrative embodiment of an arc fault detection apparatus 100, in accordance with the present invention. In the illustrated embodiment, the apparatus 100 comprises a current sensor 101, an input sense circuit 102, an arcing sense circuit 104, a power supply 106, a tripping (firing) circuit 108, a processing unit 112, and an electromechanical interface 117. In an illustrative mode of operation, the current sensor 101 monitors a Power Input via an electromechanical interface 117, and provides high frequency components of the Power Input to the input sense circuit 102. Next, the input sense circuit 102 filters and rectifies the AC signal at its input, and provides the rectified signal to the arcing sense circuit 104. The arcing sense circuit 104 then provides voltage levels and digital signals indicative of possible electrical arcing to the processing unit 112. Next, the processing unit 112 measures the voltage levels and analyzes the voltage measurements and the digital signals using one or more algorithms to determine whether the signals resulted from an arc fault or a nuisance load. In the event the signals resulted from an arc fault, the processing unit 112 activates the firing circuit 108, thereby tripping the electromechanical interface 117 to disconnect the Power Output from the load. By determining whether the AC signal sensed by the input sense circuit 102 resulted from electrical arcing or from a nuisance load before tripping the electromechanical interface 117, the processing unit 112 reduces the susceptibility of the arc fault detection apparatus 100 to nuisance tripping.

Figure 1B:
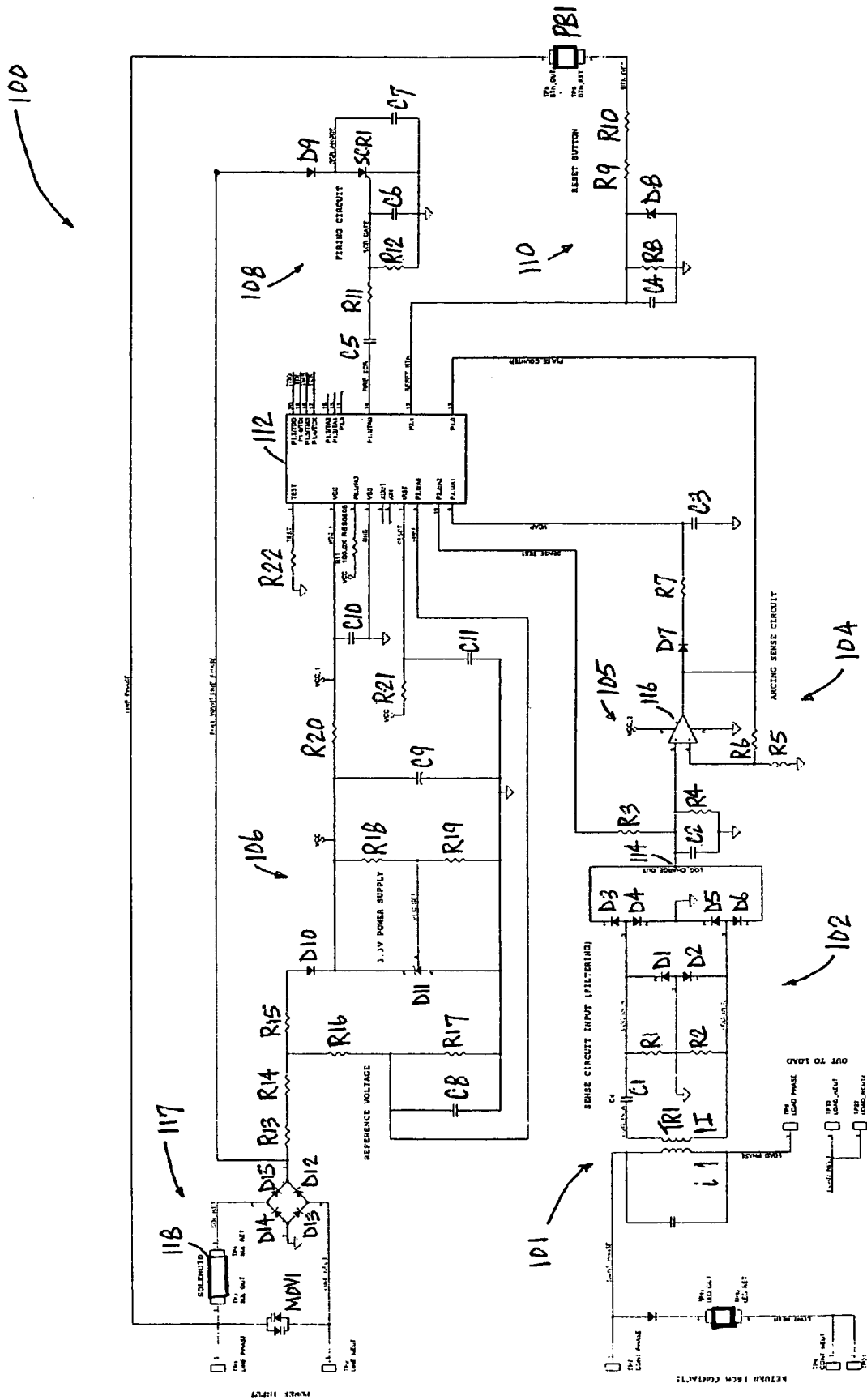

FIG. 1b depicts an illustrative implementation of the arc fault detection apparatus 100. In the illustrated embodiment, the current sensor 101 includes a transformer TR1, which monitors the Power Input by monitoring an alternating current (AC) i flowing through a load coupleable to the Power Output via a load line phase terminal TP9 and load neutral terminals TP10 and TP22. The transformer TR1 is configured for magnetically coupling the high frequency components of the AC current i from its primary coil L1 to its secondary coil L2, thereby providing an AC current I to the input sense circuit 102. In the presently disclosed embodiment, the arc fault detection apparatus 100 is implemented on a substrate such as a laminated printed circuit board (PCB) substrate, a ceramic substrate, or any other suitable substrate. Further, the primary coil L1 of the transformer TR1 surrounds the secondary coil L2 (see FIGS. 2c–2d), which has a magnetic axis perpendicular to the substrate. In the preferred embodiment, the secondary coil L2 of the transformer TR1 provides a relatively weak magnetic coupling. For example, the weakly coupled transformer TR1 may provide a mutual conductance of about 20–50 µH.

As shown in FIG. 1b, the input sense circuit 102 includes a capacitor C1, resistors R1–R2, and diodes D1–D6. The secondary coil L2 of the transformer TR1 is connected between the capacitor C1 and the resistor R2. The capacitor C1 is also connected to the resistor R1, and the resistors R1–R2 are connected to ground. The capacitor C1 high pass filters the AC signal provided by the transformer secondary coil L2, and the resistors R1–R2 provide a ground reference for the secondary coil L2. The cathode of the diode D1 is connected to the capacitor C1 and the resistor R1, the cathode of the diode D2 is connected to the secondary coil L2 and the resistor R2, and the anodes of the diodes D1–D2 are connected to ground. The cathode of the diode D1 is also connected to the anodes of the diodes D3–D4, and the cathode of the diode D2 is also connected to the anodes of the diodes D5–D6. The cathodes of the diodes D4–D5 are connected to ground, and the cathodes of the diodes D3 and D6 are connected to a node 114 providing the output of the input sense circuit 102. The diodes D1–D2 and D4–D5 are configured to form a full wave rectified bridge, and therefore the output provided at the node 114 is a full wave rectified signal. In the preferred embodiment, the diodes D3 and D6 are matched to the diodes D4–D5. Further, the diodes D3–D6 and a capacitor C2 included in the arcing sense circuit 104 form a logging circuit, thereby causing the level of the output provided at the node 114 to be proportional to the log of the input of the input sense circuit 102.

In the illustrated embodiment, the arcing sense circuit 104 includes the capacitor C2, an integrating capacitor C3, resistors R3–R7, an operational amplifier (op amp) 116, and a diode D7. As shown in FIG. 1a, the capacitor C2 and the resistor R4 are connected between the node 114 and ground. Further, the resistor R3 is connected between the node 114 and pin 10 of a micro-controller, which performs the functions of the processing unit 112 (see FIG. 1a). The op amp 116 and the resistors R5–R6 are configured to form a non-inverting amplifier 105. The capacitor C2 is connected to the non-inverting input of the op amp 116, and the voltage across the capacitor C2 is buffered and provided to the integrating capacitor C3 via the diode D7 and the resistor R7. The capacitor C3 is connected between pin 9 of the micro-controller 112 and ground. The diode D7 is configured to prevent reverse current flow from the capacitor C3. Further, the combination of the resistor R7 and the capacitor C3 forms a low pass filter to filter out high frequency noise.

It is noted that the voltage across the capacitor C2 resets with a decay time of about (C2)*(R4) seconds. For example, if R4 equals 10 kΩ and the capacitor C2 equals 1 nf, then the decay time of the capacitor C2 is about 10 μsec. The arcing sense circuit 104 is configured to convert a change in voltage across the capacitor C2 ($\Delta V_{C2}$) into a pulse having a width tpw, which may be determined from $$G*\Delta V_{C2}*e^{(-tpw/C2*R4)}=Vcc/2, \qquad (1)$$

in which "G" is the gain of the op amp 116. Each pulse generated in response to a significant di/dt event ("an arcing event") causes a change in voltage across the capacitor C3 ($\Delta V_{C3}$), which may be expressed as $$\Delta V_{C3}=(Vcc-Vbe-V_{C3})*(1-e^{(-tpw/C3*R7)})-V_{C3}, \qquad (2)$$

Accordingly, equations (1)–(2) demonstrate that as the number of arcing events increases, $\Delta V_{C3}$ increases with the log of $\Delta V_{C2}$, thereby increasing the dynamic range of the arc fault detection apparatus 100.

The micro-controller 112 is operative to take measurements of the voltage $V_{C3}$ across the integrating capacitor C3 at pin 9 of the micro-controller. For example, the micro-controller 112 may comprise a MSP430F1122 micro-controller sold by Texas Instruments Inc. (TI), Dallas, Tex., USA, or any other suitable micro-controller. In one embodiment, the micro-controller 112 measures the voltage $V_{C3}$ across the capacitor C3 once each half cycle of the line voltage near the line voltage zero crossing. The measured voltages represent the sum of voltages accumulated by the integrating capacitor C3, which is reset via a simple decay time. Accordingly, a sampling period during which each measurement is made has a duration starting when an arcing event occurs and lasting for about a decay time.

In alternative embodiments, the micro-controller 112 measures the voltage $V_{C3}$ across the integrating capacitor C3 multiple times per half cycle of the line voltage. For example, the micro-controller 112 may measure the voltage $V_{C3}$ twice each half cycle at times determined by the absolute value of the line voltage, and reset the capacitor C3 to 0 volts following each measurement. Specifically, the micro-controller 112 measures the voltage $V_{C3}$ at times corresponding to two predetermined regions of each half cycle. The micro-controller 112 then sums these measurements by first resetting the capacitor C3 to 0 volts at the beginning of each predetermined region, and then measuring the capacitor voltage at the end of each region. In the preferred embodiment, both voltage measurements per half cycle are made near the line voltage zero crossing, e.g., one measurement is made just before the zero crossing, and the other measurement is made just after the zero crossing.

In the presently disclosed embodiment, pin 9 of the micro-controller 112 is connected to an analog to digital converter (ADC) within the micro-controller 112. The ADC converts the analog voltage measurements taken across the integrating capacitor C3 to digital data, thereby allowing the micro-controller 112 to store the measurement data in internal memory. Following each measurement, the micro-controller 112 shorts pin 9 to ground to prepare the capacitor C3 to integrate current for the next sampling period. In addition, pin 10 of the micro-controller 112 is connected to the output of the op amp 116, which provides a pulse counter signal directly to pin 13 of the micro-controller 112. The micro-controller 112 employs an internal counter to monitor the pulse counter signal to keep track of pulses occurring within the signal. The micro-controller 112 then stores data relating to the measured voltages and the monitored pulses, and processes the data using one or more algorithms to determine whether the voltages/pulses were generated by an arcing event or by a nuisance load.

The arc fault detection apparatus 100 further comprises a reset circuit 110, which includes a capacitor C4, resistors R8–R10, a zener diode D8, and a pushbutton PB1 operable to connect the line phase to pin 12 of the micro-controller 112. In the illustrated embodiment, the serially connected resistors R9–R10 and the resistor R8 connected between pin 12 and ground reduce the line voltage and the line current to levels suitable for the micro-controller 112. Even though the TI MSP430F1122 micro-controller includes internal protection diodes, the zener diode D8 is connected between pin 12 and ground to provide a redundant voltage limitation. The capacitor C4 is connected between pin 12 and ground to filter out high frequency noise. When the pushbutton PB1 is actuated to initiate a test, the micro-controller 112 provides a sense test signal having an increasing pulse width at pin 10. As a result, the micro-controller 112 applies increasing voltage to the capacitor C2 through the resistor R3 as the width of the pulse increases, thereby creating simulated electrical arcing at varying voltages.

As shown in FIG. 1b, the firing circuit 108 includes capacitors C5–C7, resistors R11–R12, a diode D9, and a silicon controlled rectifier (SCR1). Specifically, the capacitor C7 is connected between the anode and the cathode of the SCR1, and the capacitor C6 and the resistor R12 are connected between the gate and the cathode of the SCR1 to prevent an unintentional turn-on of the SCR1 by a significant dv/dt event. The capacitor C5 is serially connected between pin 14 of the micro-controller 112 and the current limiting resistor R11 to prevent excessive depletion of the power supply. The electromechanical interface 117 includes a diode bridge including diodes D12–D15, a solenoid 118, and a metal oxide varistor (MOV1) connected between the line neutral and line phase terminals to prevent excessive line voltage. The diode D9 is connected between the diode bridge D12–D15 and the anode of the SCR1. The diode D9 isolates the capacitor C7 from a line voltage monitoring circuit including the resistors R16–R17 and the capacitor C8 connected to pin 8 of the micro-controller 112. Accordingly, when the SCR1 is turned on, the SCR1 draws increased current through the diode bridge D12–D15, and a voltage level approximately equal to the line voltage trips the solenoid 118 to disconnect the Power Output from the load.

In the illustrated embodiment, the power supply 106 includes resistors R13–R20, capacitors C8–C10, and diodes D10–D11. The serially connected resistors R13–R15 limit the amount of current provided to the zener diode D11. As shown in FIG. 1b, the resistor R20 is connected between the junction of the diode D10 and the zener diode D11 and the positive supply Vcc (pin 2) of the micro-controller 112. The diode D10 prevents reverse current flow from the capacitor C9, which is connected between the junction of the diodes D10–D11 and ground. Further, the capacitor C10, which is connected between pin 2 of the micro-controller 112 and ground, provides the voltage Vcc to the micro-controller 112. The serially connected resistors R16–R17 are connected between the junction of the resistors R14–R15 and ground. Further, the capacitor C8, which is connected between the junction of the resistors R16–R17 and ground, provides a reference voltage (VREF) to pin 8 of the micro-controller 112. The reference voltage VREF is proportional to the voltage of the diode bridge D12–D15, which is approximately equal to the absolute value of the line voltage. In the presently disclosed embodiment, the micro-controller 112 monitors the line voltage via VREF, and determines when to perform measurements of the voltage across the capacitor C3 based on the monitored line voltage. In an alternative embodiment, the micro-controller 112 may monitor the output of a digital timer and perform voltage measurements across the integrating capacitor C3 based on the timer output.

Figure 4:
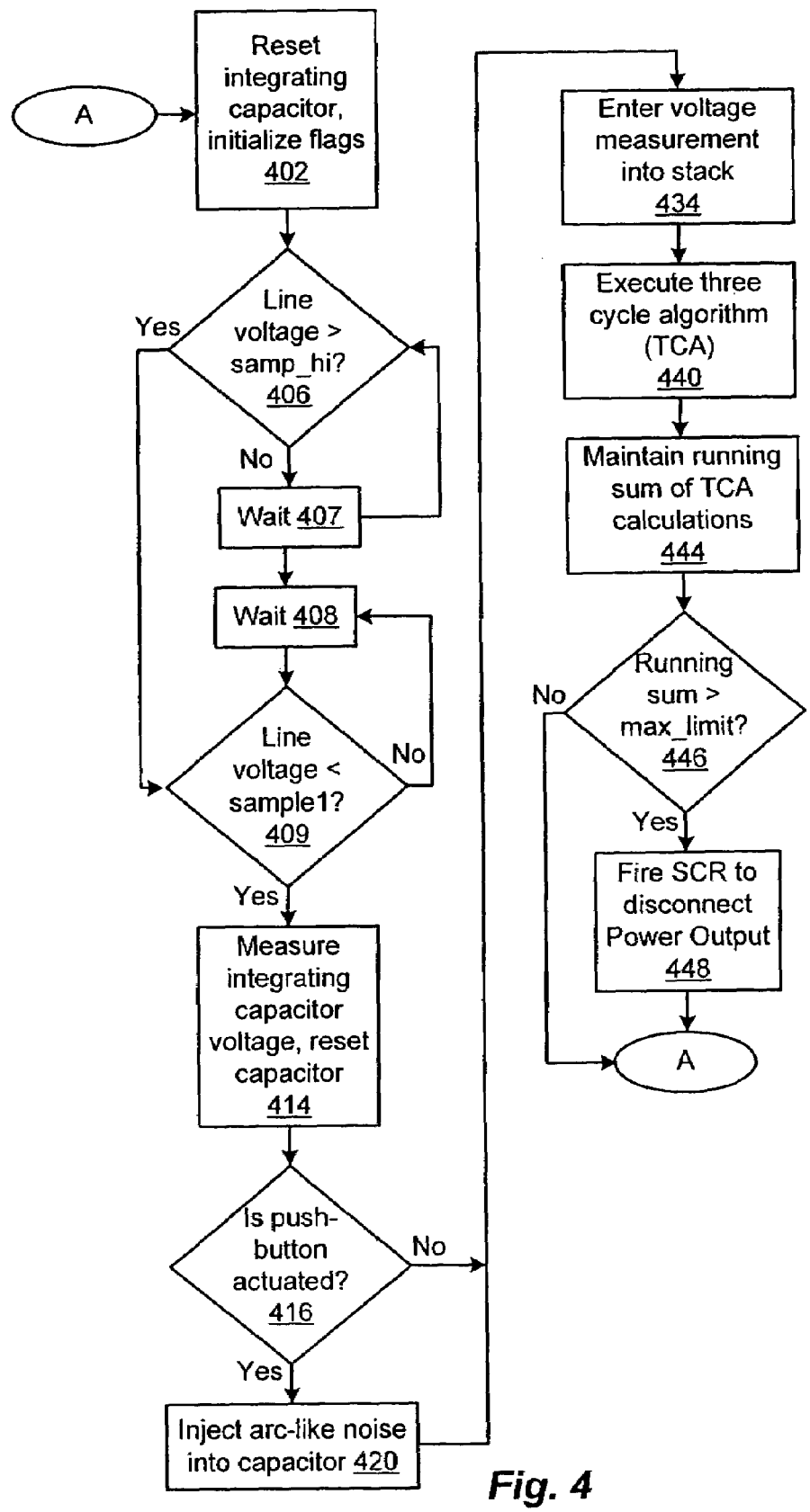

As described above, the micro-controller 112 determines the occurrence of arcing events by processing stored voltage/pulse data using one or more algorithms. A method of operating the arc fault detection apparatus 100 that employs a three cycle algorithm (TCA) to reduce the occurrence of tripping on nuisance loads is described below with reference to FIGS. 1b and 4. As depicted in step 402, the integrating capacitor C3 is reset to 0 volts and all flags within the micro-controller 112 are initialized. Steps 406–409 form a subroutine in which the method continues to loop until the until the reference voltage VREF monitored at pin 8 of the micro-controller 112 exceeds a predetermined value samp_hi and then goes below a selected value sample1, thereby defining a sampling or measurement point near the line voltage zero crossing. A measurement of the voltage across the capacitor C3 is then made, as depicted in step 414, at pin 9 of the micro-controller 112, after which the capacitor C3 is reset to 0 volts. Next, a determination is made, as depicted in step 416, as to whether the pushbutton PB1 is actuated. In the event the pushbutton PB1 is actuated, electrical arc-like noise is injected, as depicted in step 420, into the capacitor C2 through the resistor R3 connected to pin 10 of the micro-controller 112 which, with sufficient noise injected over a plurality of half cycles of the line voltage and processed by the TCA in step 440 described below, causes the solenoid 118 to trip in the same manner as a detected electrical arc in the load current.

In the preferred embodiment, because a minimal voltage is required to sustain an electrical arc, e.g., about 15 volts, a window typically up to 50 volts is selected for voltage measurement to account for phase differences between the line current and the line voltage. This window around the line voltage zero crossing captures relatively small arcs that are typically generated or extinguished near the zero crossing.

Next, the voltage measurement is converted to digital form and pushed, as depicted in step 434, onto a stack within the micro-controller 112 to maintain a history of measurement data. In the presently disclosed embodiment, successive voltage measurement values are entered as words into the stack. The TCA is then executed, as depicted in step 440. Specifically, the word of cycle 1 (i.e., V[n−1]) minus the word of cycle 2 (i.e., V[n]) is calculated and the absolute value is taken to obtain a first calculated value, the word of cycle 3 (i.e., V[n+1]) minus the word of cycle 2 (i.e., V[n]) is calculated and the absolute value is taken to obtain a second calculated value, and the word of cycle 3 (i.e., V[n+1]) minus the word of cycle 1 (i.e., V[n−1]) is calculated and the absolute value is taken to obtain a third calculated value. The first value plus the second value minus the third value is then calculated and the absolute value is taken. The TCA executed in step 440 may therefore be expressed as $$TCA = |(|V_{[n-1]} - V_{[n]}| + |V_{[n+1]} - V_{[n]}| - |V_{[n+1]} - V_{[n-1]}|)|, \quad (3)$$

It is understood that the outermost pair of absolute value signs in equation (3) are not strictly required, but are included to emphasize the need to avoid the occurrence of least significant bit (LSB) errors during execution of the TCA. It is noted that the adjacent full cycles 1–3 employed in the TCA may or may not be overlapping. If the three cycles are not overlapping, then six half cycles are required to execute the TCA. If the three cycles are overlapping, then only four half cycles are required for the TCA.

Next, at least one continuous running sum of TCA calculations is maintained, as depicted in step 444. Each running sum of TCA calculations represents the total amount of electrical arcing that occurs over a respective sampling period. At the end of the sampling period, a determination is made, as depicted in step 446, as to whether the running sum exceeds a predetermined maximum threshold value max_limit. In the event the running sum value exceeds max_limit, an arc fault is detected and the SCR1 is fired, as depicted in step 448, to disconnect the Power Output from the load. In the preferred embodiment, the SCR1 is fired three times to assure firing even if there is a brief interruption of the line voltage. In the presently disclosed embodiment, a pulse having a selected width, e.g., 30 μsec, is provided to the SCR1. The method then loops back to step 402 to prepare the integrating capacitor C3 for subsequent voltage measurements.

Figure 2A:
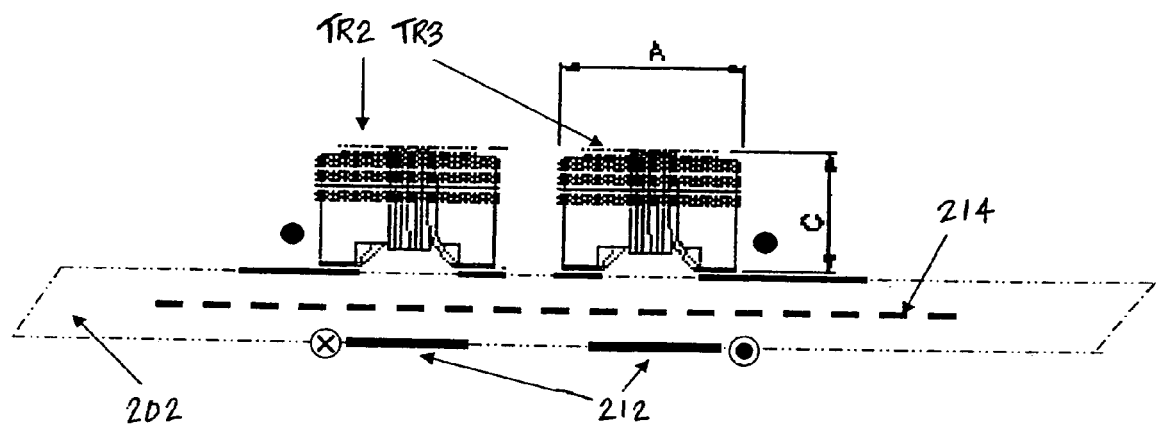

Having described the above illustrative embodiments, other alternative embodiments or variations may be made. For example, it was described that the arc fault detection apparatus 100 is implemented on a substrate, and that the primary coil L1 of the transformer TR1 surrounds an inductive pickup coil having a magnetic axis that is perpendicular to the substrate. FIG. 2a depicts a first alternative embodiment, in which the primary coil L1 is implemented as a first U-shaped conductive trace 212 disposed in and parallel to a substrate 202. In this embodiment, the magnetic axis of the inductive pickup coil is parallel to the substrate 202, and the current flowing through the primary coil L1 is perpendicular to the axis of the pickup coil. As shown in FIG. 2a, an electrostatic shield comprising a second conductive trace 214 is disposed between the first trace and the pickup coils. It is noted that the transformer TR1 may be implemented as a single surface mount pickup coil, or as two surface mount pickup coils TR2–TR3 to provide a grounded center tap for reducing capacitive coupling between the primary and pickup coils. In the presently disclosed embodiment, the polarity of the two pickup coils TR2–TR3 is independent of 180° rotation about an axis perpendicular to the magnetic axis. In addition, the substrate 202 functions as an insulator between the primary coil 212 and the pickup coils.

As shown in FIG. 2a, the two surface mount pickup coils TR2–TR3 are disposed on one side of the substrate 202, and the primary coil trace 212 is underneath and perpendicular to the magnetic axes of the pickup coils. It is appreciated that the U-shaped trace 212 of the primary coil L1, which is connected to the line current, may be replaced by one line current trace and one return current trace. In this way, arc detection capability may be provided even if the line and return connections are reversed.

Figure 2B:
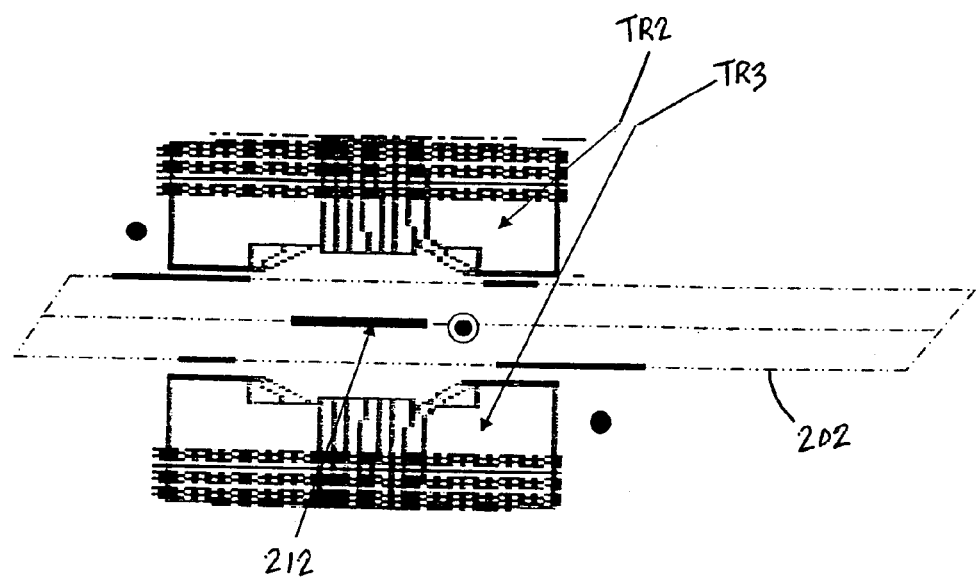
Figure 2C:
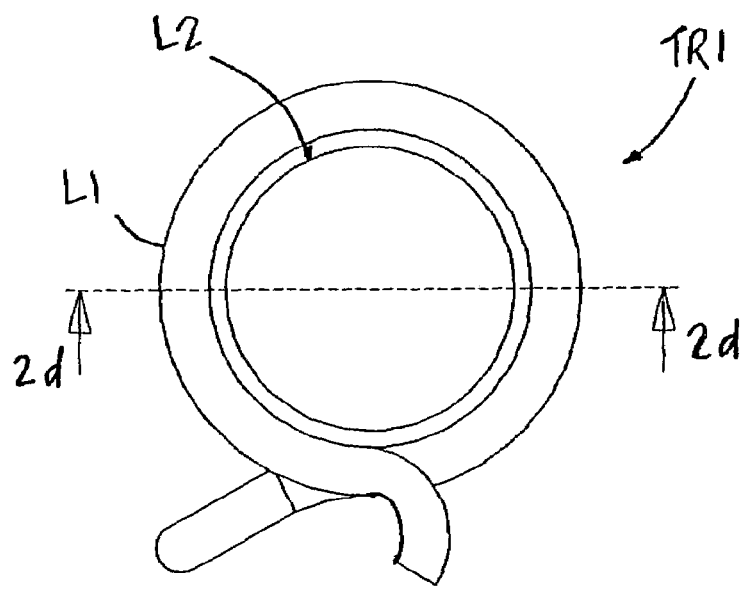
FIGS. 2c–2d are views illustrating a transformer included in the transformer configurations of FIGS. 2a–2b.
Figure 2D:
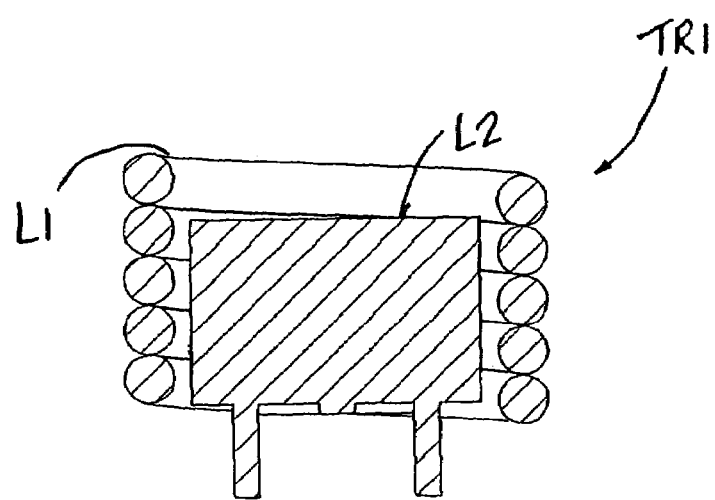

FIG. 2b depicts a second alternative embodiment, in which the two surface mount pickup coils TR2–TR3 are placed substantially opposite one another on opposing sides of the substrate 202, and the primary coil trace 212 is disposed between the pickup coils, thereby providing increased mutual inductance. For example, each pickup coil may comprise a 5315TC (Ferrite) series RFID transponder coil sold by Coilcraft Corporation, Cary, Ill., USA, or any other suitable pickup coil.

Figure 3A:
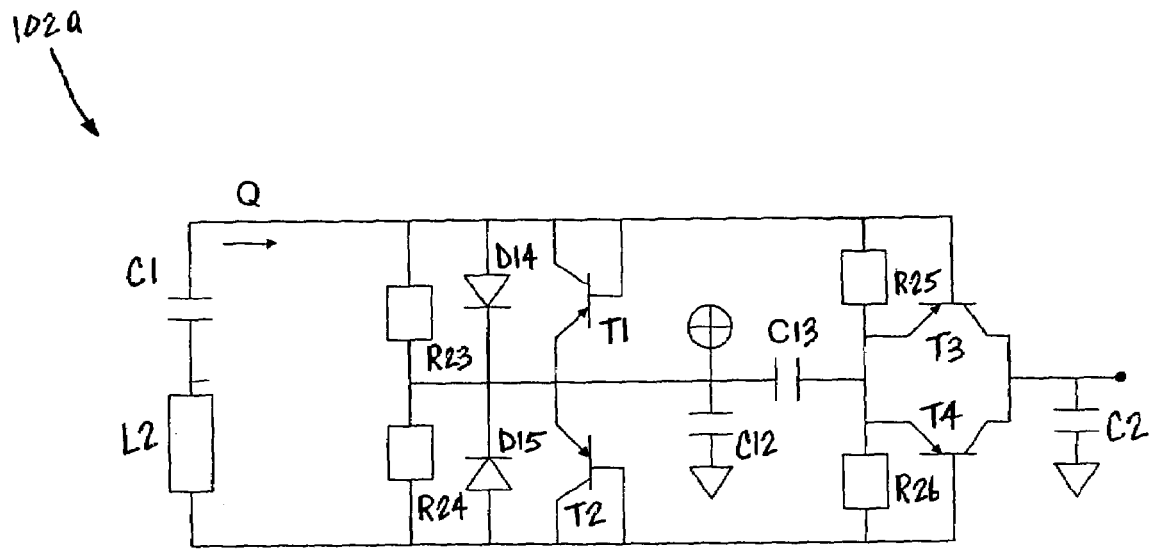

It was also described that the input sense circuit 102 (see FIG. 1b) may be configured to allow the micro-controller 112 to perform voltage measurements once per half cycle of the line voltage. FIG. 3a depicts a sum of logarithm circuit 102a, which is a first alternative embodiment of the input sense circuit 102. Like the input sense circuit 102, the sum of logarithm circuit 102a allows the micro-controller 112 to measure the voltage across the capacitor C3 once per half cycle near the line voltage zero crossing. As shown in FIG. 3a, the sum of logarithm circuit 102a includes the capacitor C1, capacitors C12–C13, resistors R23–R26, diodes D14–D15, and transistors T1–T4. The transistors T1–T4 and the capacitor C13 form a logging circuit, and the change in voltage across the capacitor C13 may be expressed as $$\Delta V_{C13} \approx vT * \ln(|Q|/(C*vT)+1), \quad (4)$$

in which "|Q|" is equal to the arc-produced charge flowing through the primary coil L1 of the transformer TR1, and $$vT = kT/q, \quad (5)$$

in which "vT" is equal to about 26 mV at room temperature. In the presently disclosed embodiment, each arcing event increases the voltage across the capacitor C2 by (C13/C2)*ΔV. Further, the voltage across the capacitor C13 resets with a decay time of about (C13)*(R23) seconds. For example, if each one of the resistors R23–R26 equals 10 kΩ and the capacitor C13 equals 10 nf, then the decay time is about 100 μsec. Accordingly, the charge injected by an arcing event into the capacitor C1 equals the charge injected into the capacitor C13, beginning at the time of the arcing event and ending about a decay time later.

Figure 3C:
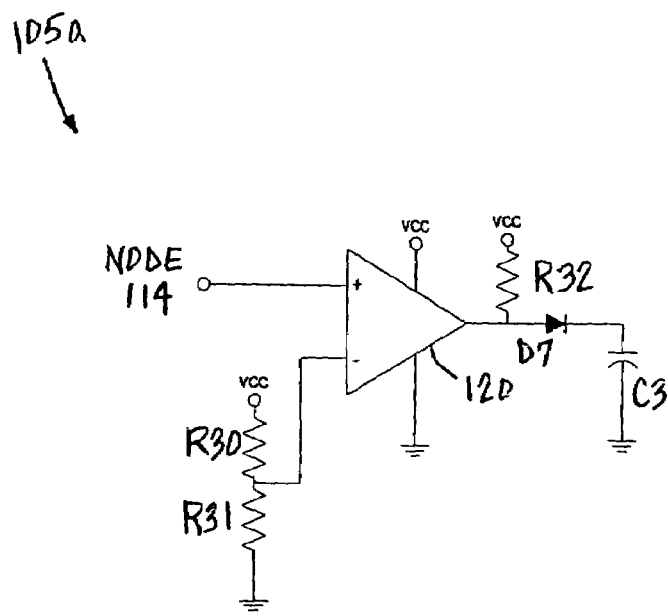
Figure 3B:
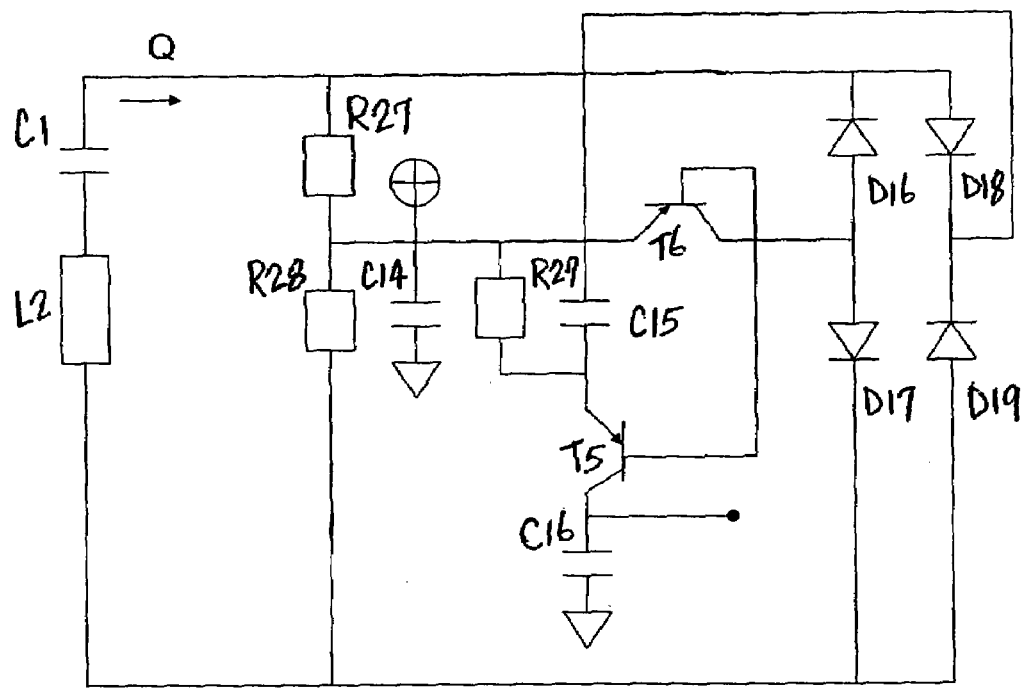

FIG. 3b depicts a sum of logarithm circuit 102b, which is a second alternative embodiment of the input sense circuit 102 (see FIG. 1b). As shown in FIG. 3b, the sum of logarithm circuit 102b includes the capacitor C1, resistors R27–R29, capacitors C14–C16, transistors T5–T6, and diodes D16–D19. In this alternative embodiment, the sum of logarithm circuit 102b employs only one matched transistor pair T5–T6 in the logging circuit.

It was also described that the arcing sense circuit 104 (see FIG. 1b) includes the op amp 116 and the resistors R5–R6, which form a non-inverting amplifier 105. FIG. 3c depicts a comparator circuit 105a that may be employed in place of the non-inverting amplifier 105. As shown in FIG. 3c, the comparator circuit 105a includes a comparator 120, resistors R30–R32, the diode D7, and the capacitor C3. Specifically, the resistors R30–R31 form a voltage divider that biases the inverting input of the comparator. When the level of the signal provided to the non-inverting input of the comparator 120 by the input sense circuit 102 exceeds the level at the inverting input of the comparator 120, the comparator 120 charges the capacitor C3 through the resistor R32 at a rate proportional to (R32)*(C3). It is noted that the capacitor C3 continues to charge the capacitor C3 so long as the signal level at the non-inverting input of the comparator 120 remains greater than Vcc*[R31/R30+R31)]. Accordingly, each time a significant change in load current is detected at the input of the comparator circuit 105a (i.e., each time a significant di/dt event occurs), the output of the comparator is driven to its positive rail, thereby generating a pulse for charging the capacitor C3 through the diode D7 and the resistor R7.

In the presently disclosed embodiment, the micro-controller 112 is operative to execute a first pulse counter algorithm to count the number of times the output of the comparator circuit 105a (or the non-inverting amplifier 105) is driven high during each half cycle. Due to the generally chaotic nature of electrical arcing, arc faults typically produce varying numbers of arcing events per half cycle of the line voltage. In contrast, nuisance loads typically produce the same number of arcing events per half cycle, and may therefore produce arcing events periodically over multiple half cycles. Such information may be used to inhibit nuisance tripping under normal operating conditions, and to allow tripping to occur when arc faults are detected. Specifically, the comparator circuit 105a provides the pulse counter signal to pin 13 of the micro-controller 112, which uses this signal during the execution of the first pulse counter algorithm. Each time the output of the comparator circuit 105a is driven high during each half cycle, as indicated by the level of the pulse counter signal, a digital counter within the micro-controller 112 is incremented. When the capacitor C3 is reset by the micro-controller 112, the counter value is stored within the micro-controller 112, and the first pulse counter algorithm is executed. In the presently disclosed embodiment, the micro-controller 112 executes the first pulse counter algorithm to determine the periodicity of a predetermined number of data elements in one or more measurement data sets stored in the micro-controller 112. For example, in the event the stored counter value is equal to four, the first pulse counter algorithm may be used to determine the periodicity of 1–4 data elements in at least one measurement data set.

Figure 5A:
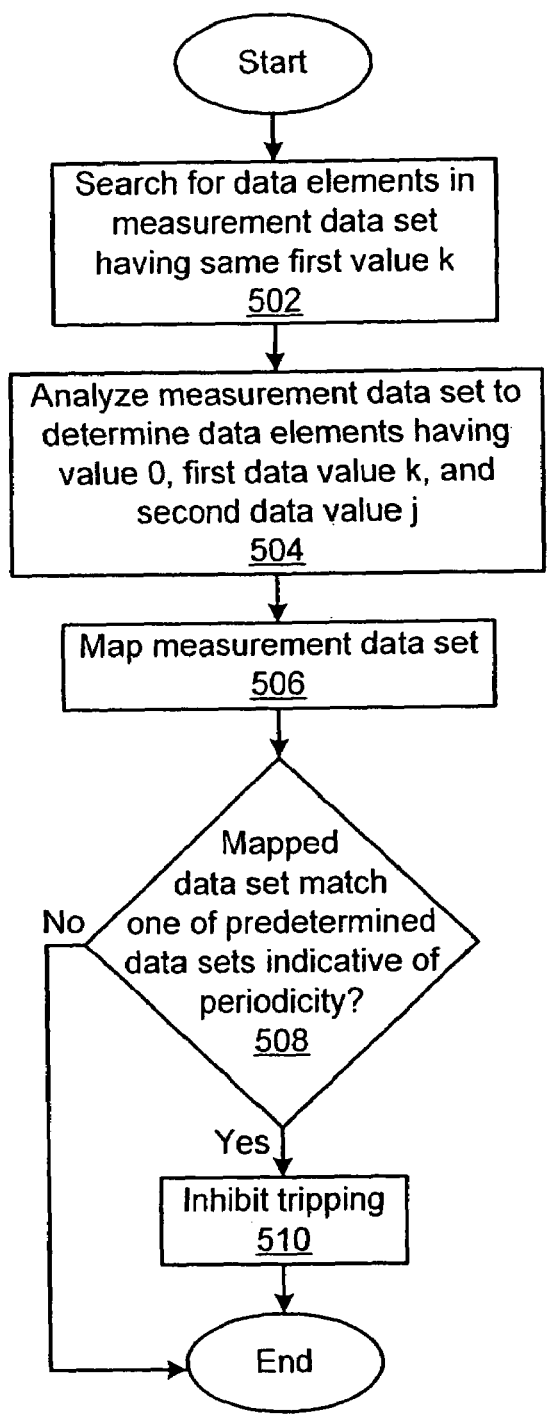

The operation of the first pulse counter algorithm is described below with reference to FIG. 5a. As depicted in step 502, the pulse counter algorithm searches for a predetermined number of data elements in a set of measurement data having the same first data value k. The entire measurement data set is then analyzed, as depicted in step 504, to determine the presence of data elements having a value of zero (0's), to determine the presence of additional data elements having the first data value (k's), and to determine the presence of data elements having a second data value different from the first data value (j's) Next, the data set is mapped, as depicted in step 506. For example, an exemplary data set may contain a first data element having a zero value, a second data element having a first value of 3, a third data element having the same first value of 3, and a fourth data element having a different second value of 2, and may therefore be mapped to [0,k,k,j]. Next, a determination is made, as depicted in step 508, as to whether the mapped data set matches at least one of a plurality of predetermined data sets indicative of the periodicity of multiple arcing events. As explained above, nuisance loads typically produce periodic arcing events, while arcing events produced by arc faults are typically non-periodic. In addition, certain start-up and shutdown conditions may resemble periodic arcing events. FIG. 6 depicts an illustrative mapping of a plurality of data sets indicative of periodic arcing events. For example, the exemplary mapping [0,k,k,j] described above does not match any of the data sets shown in FIG. 6. In this case, the pulse counter is not regarded as being "active" (N) and tripping is allowed. In the event a match is made, as depicted in step 510, the pulse counter is regarded as being "active" (Y) and tripping is inhibited, thereby reducing the occurrence of nuisance tripping under normal operating conditions. For example, tripping may be inhibited by increasing the predetermined maximum threshold value max_limit and/or any other suitable constant and/or coefficient employed by the above-described three cycle algorithm (TCA). It is understood that the constants/coefficients employed, by the TCA may also be suitably modified to enable tripping when significant arc faults are detected.

As described above, the first pulse counter algorithm includes the step of determining whether a mapped data set matches at least one predetermined data set indicative of the periodicity of an arcing event. In an alternative embodiment, a determination may also be made as to whether the mapped data set matches one or more predetermined data sets indicative of insignificant events (e.g., noise) in the data history. For example, such a data set may map to [0,k,k,j, k,k], which would be indicative of periodicity but for the single "j" element in the mapping. By inhibiting tripping when such a match occurs, a degree of noise filtering may be incorporated into the first pulse counter algorithm.

Figure 5B:
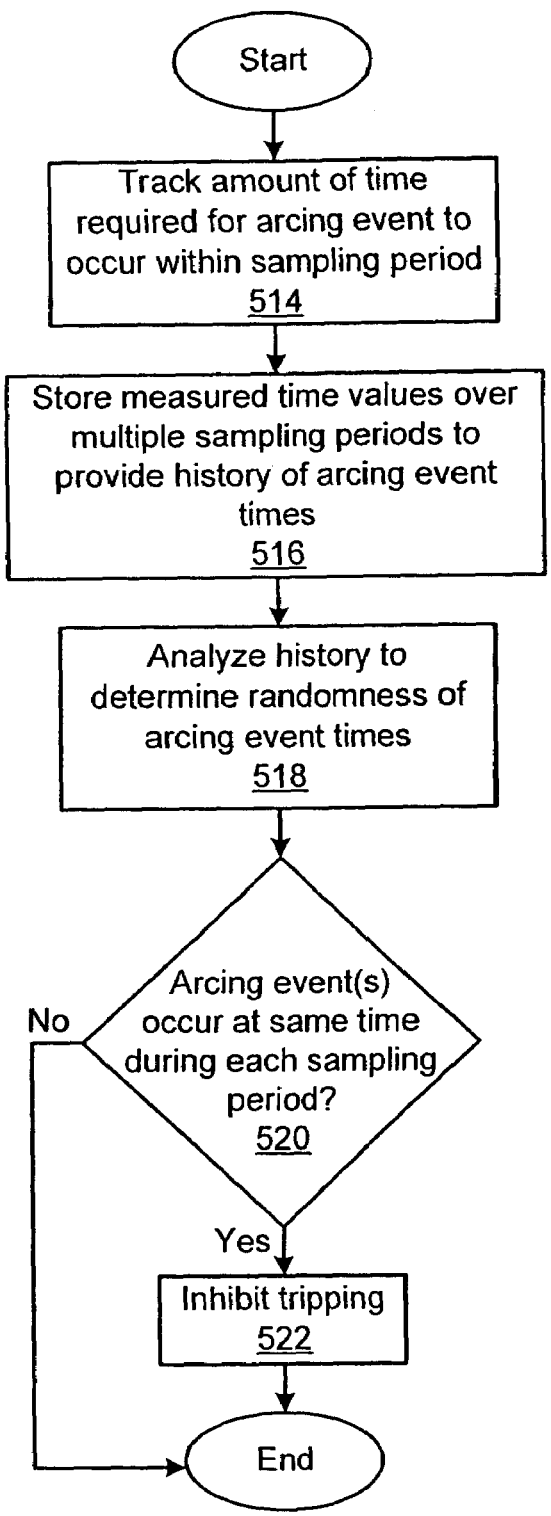

In the presently disclosed embodiment, a second pulse counter algorithm is also executed to capture timing information relating to one or more arcing events. The second pulse counter algorithm is described below with reference to FIG. 5b. As depicted in step 514, the counter within the micro-controller 112 is employed to track the amount of time required for an arcing event to occur within the sampling period. For example, the counter may be used to measure the time from the beginning of the sampling period to the occurrence of an arcing event within the sampling period. A plurality of measured time values is then stored, as depicted in step 516, over a number of sampling periods to provide a history of arcing event times. Next, the time history is analyzed, as depicted in step 518, to determine the randomness of the arcing times. A determination is then made, as depicted in step 520, as to whether an arcing event occurs at substantially the same time during each sampling period. In the event the arcing occurs at substantially the same time during each sampling period, the arcing is deemed to be caused by a nuisance load and tripping is inhibited, as depicted in step 522. It is understood that the constants/coefficients employed by the above-described three cycle algorithm may be suitably modified to inhibit and/or enable tripping based on the arc timing history obtained by the second pulse counter algorithm.

Figure 3D:
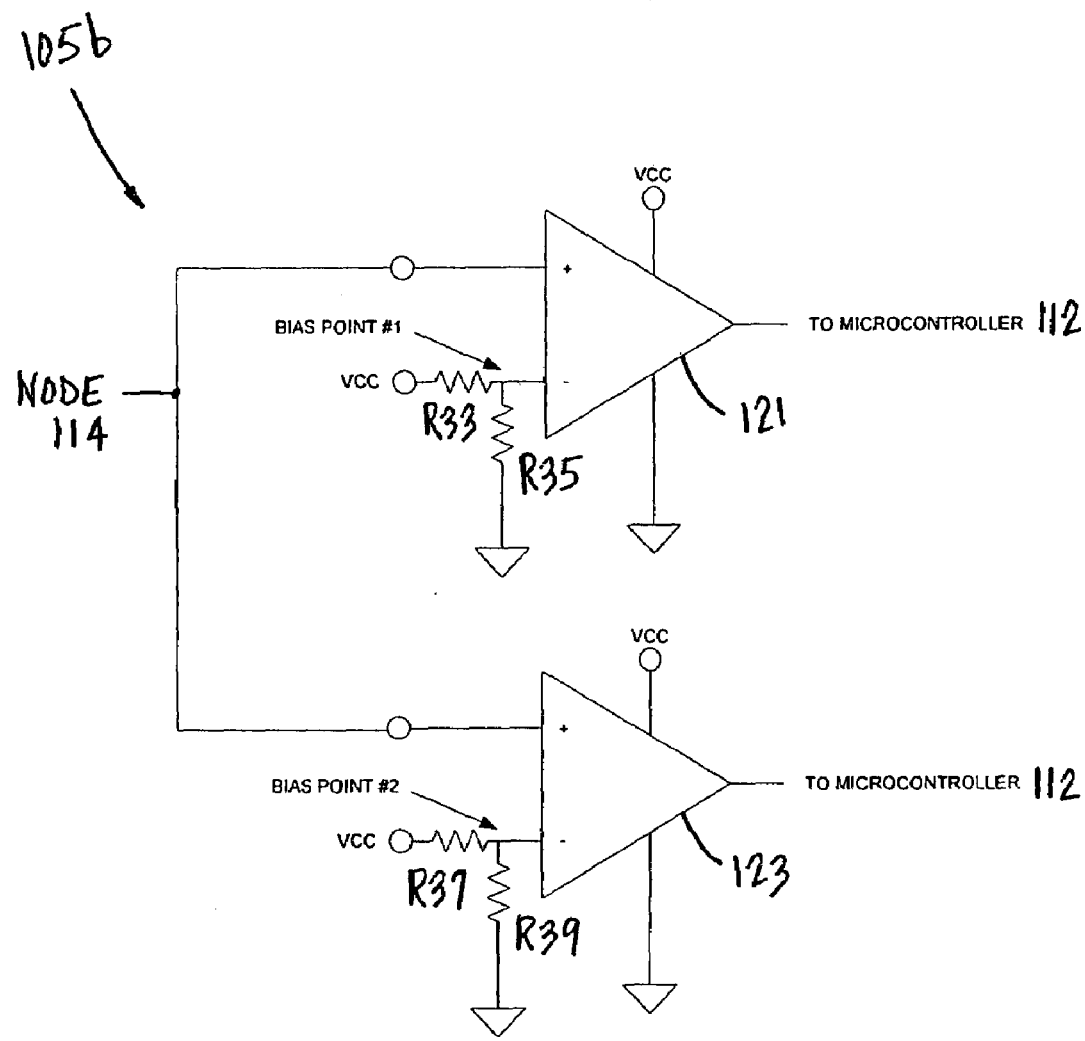

To account for the non-linearity of electrical arcing signals, the comparator circuit 105a may be modified to provide multiple digital output signals corresponding to respective voltage threshold values. FIG. 3d depicts an illustrative embodiment of a comparator circuit 105b providing multiple digital outputs. As shown in FIG. 3d, the comparator circuit 105b includes comparators 121 and 123, and resistors R33, R35, R37, and R39. Further, the non-inverting inputs of the comparators 121 and 123 are connectable to the node 114 (see FIG. 1b), and the outputs of the comparators 121 and 123 are connectable to suitable digital inputs of the micro-controller 112. Specifically, the resistors R33, R35, and R37, R39 form voltage dividers that bias the inverting inputs of the comparators 121 and 123, respectively. For example, the voltage dividers may bias the comparators 121 and 123 at predetermined low and high voltage levels, respectively. In this alternative embodiment, the digital counter within the micro-controller 112 starts to increment when the comparator 121 provides a first digital output indicating that the level of the arcing signal has exceeded the low voltage threshold. Next, the rate at which the counter is incremented is increased as the arcing level exceeds the high voltage threshold, as indicated by a second digital output provided by the comparator 123. The rate at which the counter is incremented is then decreased as the arcing level goes below the successive thresholds, as indicated by the first and second digital outputs provided by the respective comparators 121 and 123.

It was also described that the TCA may be expressed as $$TCA = |(|V_{[n-1]} - V_{[n]}| + |V_{[n+1]} - V_{[n]}| - |V_{[n+1]} - V_{[n-1]}|)|$$

(see equation (3)). However, equation (3) provides a relatively smooth response to single arcing events. To achieve a response to single arcing events that is more characteristic of an impulse, a modified TCA may be expressed as $$Knob\_TCA = TCA\_1 + (knob) * TCA\_2, \quad (6)$$

in which "TCA_1" is expressed as equation (3), "knob" is a constant, and "TCA_2" is expressed as $$TCA\_2 = |V_{[n-1]} - 2*V_{[n]} + V_{[n+1]}|, \quad (7)$$

in which V[n−1] represents a first voltage measurement corresponding to a first cycle of the line voltage, V[n] represents a second voltage measurement corresponding to a second cycle of the line voltage, and V[n+1] represents a third voltage measurement corresponding to a third cycle of the line voltage. It is noted that TCA_2 provides more of an impulse response to single arcing events. In equation (6) above, the knob constant may be adjusted (e.g., the knob constant may be set to ⅛ or any other suitable value) to provide varying amounts of impulse response.

It was also described that the resulting sum of the three cycle algorithm (TCA) is added to a continuous running sum of TCA calculations that represents the total amount of electrical arcing occurring over the sampling period. At the end of each sampling period, the running sum is compared to the predetermined maximum threshold value max_limit, and the SCR1 is fired in the event the threshold is exceeded. In an alternative embodiment, to further avoid nuisance tripping, the micro-controller 112 (see FIG. 1) is operative to execute an arcing event counter algorithm to count the number of arcing events included in the running sum.

Figure 7:
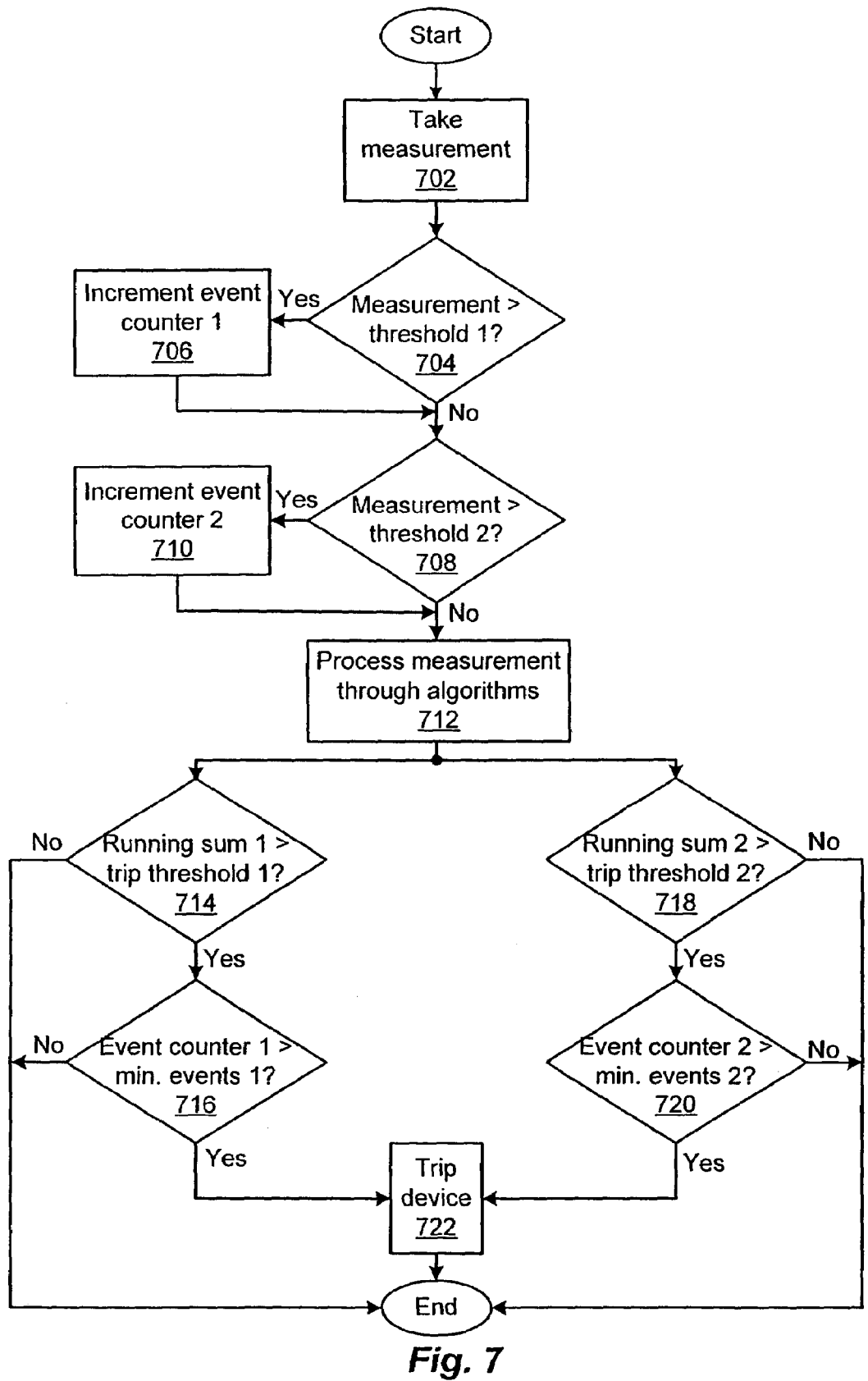

The arcing event counter algorithm is described below with reference to FIG. 7. As depicted in step 702, the voltage across the capacitor C3 is measured. Next, a determination is made, as depicted in step 704, as to whether the measured voltage value exceeds a first predetermined threshold value. If the measured voltage value exceeds the first threshold value, then a first event counter within the micro-controller 112 is incremented, as depicted in step 706. Next, at least one second determination is optionally made, as depicted in step 708, as to whether the measured voltage value exceeds a second predetermined threshold value. If the measured voltage value exceeds the second threshold value, then a second event counter within the micro-controller 112 is incremented, as depicted in step 710. Next, the measurement of the voltage across the capacitor C3 is processed, as depicted in step 712, by at least one algorithm such as the TCA described above. In the preferred embodiment, the voltage measurement is then added to first and second running sums of voltage measurements. For example, the first running sum of voltage measurements may correspond to a short sampling period during which large voltage measurements are monitored over a short period of time, and the second running sum of voltage measurements may correspond to a long sampling period during which smaller voltage measurements are monitored over a longer period of time. As depicted in step 714, a determination is made as to whether the first running sum (running sum 1) exceeds a first predetermined trip threshold (trip threshold 1). In the event the first running sum value exceeds the first trip threshold value, a determination is made, as depicted in step 716, as to whether the output of the first event counter (event counter 1) exceeds a first predetermined minimum number of events (min. events 1). In the event the first event counter output exceeds the first number of events, tripping occurs, as depicted in step 722, to disconnect the Power Output from the load. As depicted in step 718, a determination is made as to whether the second running sum (running sum 2) exceeds a second predetermined trip threshold (trip threshold 2). In the event the second running sum value exceeds the second trip threshold value, a determination is made, as depicted in step 720, as to whether the output of the second event counter (event counter 2) exceeds a second predetermined minimum number of events (min. events 2). In the event the second event counter output exceeds the second number of events, tripping occurs, as depicted in step 722, to disconnect the Power Output from the load. Accordingly, if either the first event counter output exceeds the first predetermined count number or the second event counter output exceeds the second predetermined count number, then tripping occurs. Otherwise, no tripping takes place.

In this way, nuisance tripping due to, e.g., noisy switching signals is avoided. Although such noisy signals may result in relatively large voltage measurements, they are not necessarily indicative of electrical arcing. By monitoring the level of the running sum of measured voltages, and by tracking the number of arcing events included in the running sum, electrical arcing containing several half cycles of arcing events can be more reliably detected, and nuisance loads containing only a limited number of arcing events can be more safely ignored.

It was also described that the micro-controller 112 monitors the line voltage via VREF, and determines when to perform measurements of the voltage across the capacitor C3 based on the monitored line voltage. Under normal operating conditions, the time between these voltage measurements is regular and periodic. However, during high current arcing conditions, the VREF signal can become degraded due to a line voltage drop out caused by a momentary hard short circuit. If the micro-controller 112 is looking for a specific voltage point on the half cycle of the line voltage, then such a voltage drop out could cause an inadvertent or early command to measure. In addition, during this type of arcing event, the voltage on the integrating capacitor C3 is typically relatively high. During a normal line drop out (or brown out), a purported measurement point may be found by the micro-controller, but there may be no abnormal voltage on the capacitor C3. In contrast, during a high current arcing condition, a purported measurement point may be found and a relatively high voltage may be detected on the capacitor C3. Accordingly, to detect high level arcing, the micro-controller 112 is operative to measure the time between measurement points. In the event an early measurement is found and a relatively large capacitor voltage $V_{C3}$ is detected, the micro-controller activates the firing circuit 108, thereby tripping the solenoid 118 to disconnect the Power Output from the load.

It was also described that the micro-controller 112 (see FIG. 1) may take measurements of the voltage across the capacitor C3 twice each half cycle, convert the voltage measurements to digital form using an analog to digital converter (ADC), store the measured voltage data, and discharge the capacitor C3 when the voltage measurements are completed. It is noted that the voltage across the capacitor C3 represents the integral of the signal provided by the non-inverting amplifier 105. In an alternative embodiment, a digital counter within the micro-controller 112 is employed as an accumulator for effectively integrating the output of the non-inverting amplifier 105, thereby obviating the need for the integrating capacitor C3 and the ADC.

Figure 8:
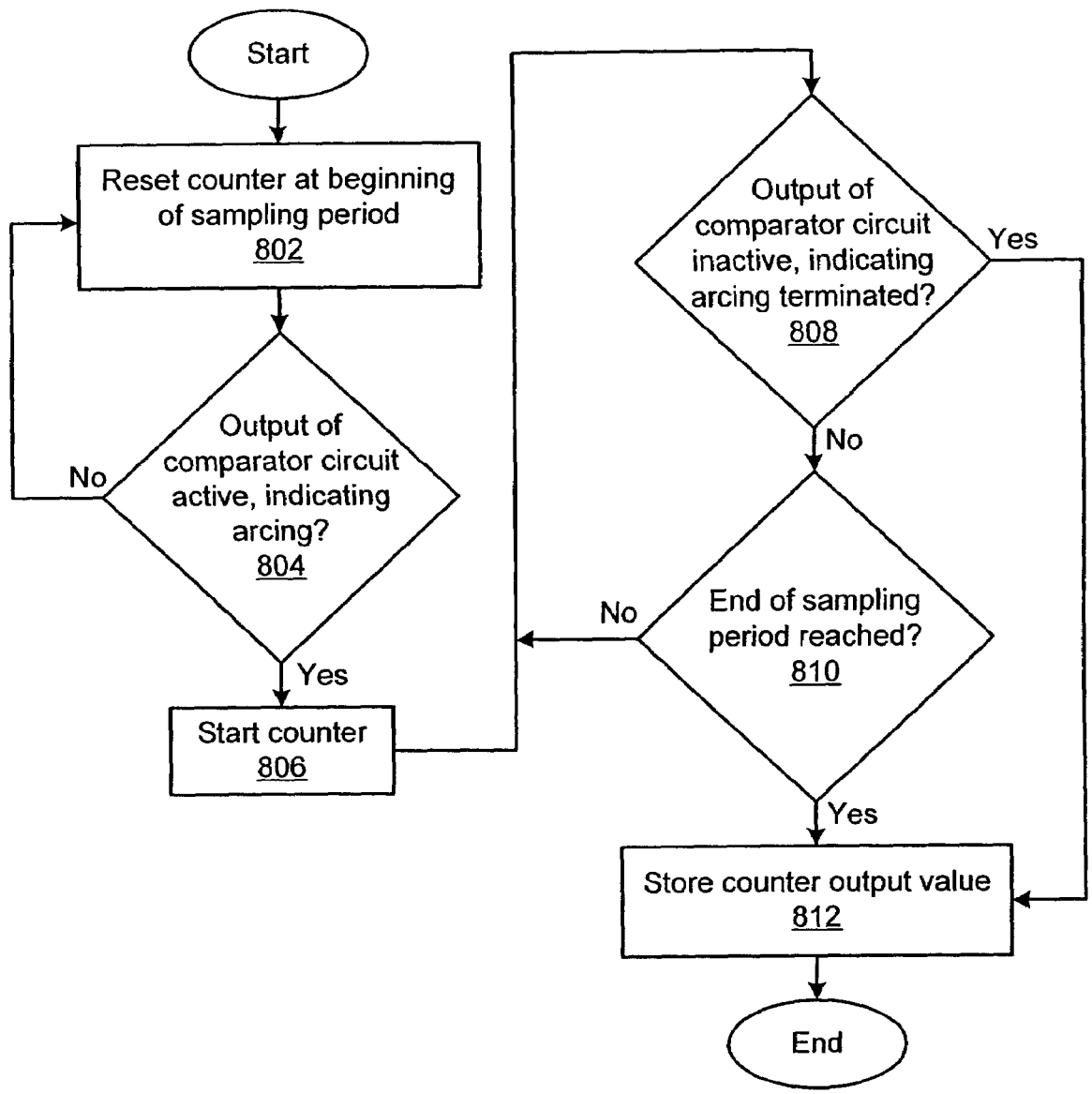

In this alternative embodiment, the comparator circuit 105a or 105b is used in place of the non-inverting amplifier 105, and the digital output(s) of the comparator circuit is provided directly to the micro-controller 112 for incrementing the internal counter. Further, the sampling period is defined as having a duration corresponding to one or more half cycles of the line voltage. The operation of the micro-controller 112 and the internal counter for integrating the output of the comparator circuit 105a is described below with reference to FIG. 8. As depicted in step 802, the counter is reset at the beginning of the sampling period. Next, a determination is made, as depicted in step 804, as to whether the output of the comparator circuit 105a is active, thereby indicating the presence of electrical arcing. In the event the comparator circuit output is active, the counter is started, as depicted in step 806. A determination is then made, as depicted in step 808, as to whether the output of the comparator circuit 105a has become inactive, indicating the termination of electrical arcing. In the event electrical arcing has terminated, the method branches to step 812. Otherwise, a determination is made, as depicted in step 810, as to whether the end of the sampling period has been reached. In the event the end of the sampling period has been reached, the method proceeds to step 812. Otherwise, the method loops back to step 808. Next, the output value of the counter is stored, as depicted in step 812. The stored counter output, which represents the integral of the output of the comparator circuit 105a, is subsequently used in place of the voltage measurements across the integrating capacitor C3 in the arc detection algorithms described above.

Figure 9:
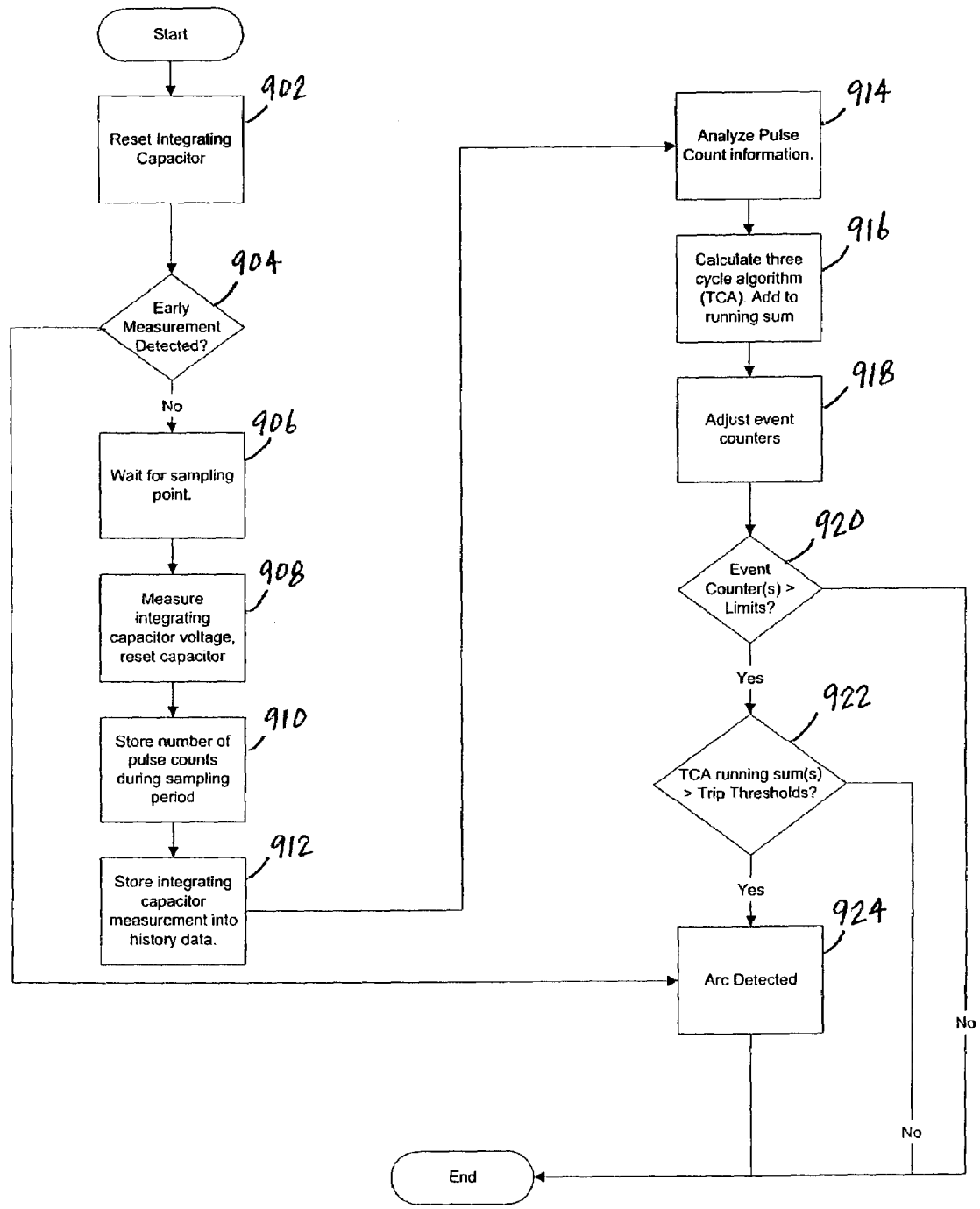

A method of operating the arc fault detection apparatus 100 that employs the arc detection algorithms including the pulse counter algorithm, the three cycle algorithm (TCA), and the arcing event counter algorithm is illustrated by reference to FIGS. 1b and 9. As depicted in step 902, the integrating capacitor C3 is reset to 0 volts. Next, a determination is made, as depicted in step 904, as to whether an early command to measure is detected. For example, the micro-controller 112 may detect such an early command to perform a voltage measurement if the VREF signal becomes degraded due to a line voltage drop out. In the event an early measurement is detected and an excessively large voltage across the capacitor C3 is measured, an arc fault is detected, as depicted in step 924, and the solenoid 118 is tripped to disconnect the Power Output from the load. Otherwise, the micro-controller 112 monitors the VREF signal and waits, as depicted in step 906, for the sampling or measurement point to arrive.

When the measurement point arrives, the voltage across the integrating capacitor C3 is measured, as depicted in step 908, after which the capacitor C3 is reset to 0 volts. Next, the micro-controller 112 monitors the pulse counter signal provided by the arcing sense circuit 104 and stores, as depicted in step 910, the number of pulse counts occurring during the sampling period. In addition, the micro-controller 112 stores, as depicted in step 912, the integrating capacitor voltage measurement into the history data store (e.g., a stack). The stored pulse count information is then analyzed, as depicted in step 914, using the above-described pulse counter algorithm. Next, the three cycle algorithm (TCA) is executed, as depicted in step 916, using the stored history of voltage measurement data, and resulting TCA calculations are added to at least one running sum. One or more event counters within the micro-controller 112 are then adjusted, as depicted in step 918, and the voltage measurements are analyzed using the above-described arcing event counter algorithm. A determination is then made, as depicted in step 920, as to whether one or more event counters exceed predetermined minimum numbers of arcing events. If the event counter(s) exceeds the predetermined minimum number(s) of arcing events, another determination is made, as depicted in step 922, as to whether the TCA running sum(s) exceeds a predetermined trip threshold value. In the event the TCA running sum(s) exceeds the predetermined trip threshold, an arc fault is detected, as depicted in step 924, and the solenoid 118 is tripped to disconnect the Power Output from the load.

It should be appreciated that the above-described arc fault detection apparatus 100 may also be employed to provide DC arc fault detection. In this case, instead of monitoring the line voltage via VREF to determine when to perform voltage measurements, the micro-controller 112 may alternatively employ an internal digital counter as a time base to generate suitable periods for sampling the voltage across the integrating capacitor C3.

It will further be appreciated by those of ordinary skill in the art that further modifications to and variations of the above-described apparatus and method for detecting arc faults may be made without departing from the inventive concepts disclosed herein. Accordingly, the invention should not be viewed as limited except as by the scope and spirit of the appended claims.

What is claimed is:

1. Arc fault detection apparatus, comprising:
   a power input;
   an input sense circuit configured to sense a signal associated with the power input, the sensed signal being indicative of at least one potential arcing event;
   an arcing sense circuit including an amplifying sub-circuit and an accumulating sub-circuit, the amplifying sub-circuit being configured to receive a representation of the sensed signal and to generate a respective pulse corresponding to the at least one potential arcing event, the accumulating sub-circuit being configured to receive respective pulses generated by the amplifying sub-circuit and to generate an accumulated signal over a predetermined time period; and
   a processor operative to receive the accumulated signal and the respective pulses from the arcing sense circuit, to generate first data representative of the accumulated signal and second data representative of the respective pulses, and to process at least one of the first and second data in accordance with at least one algorithm to determine whether the at least one potential arcing event is indicative of an arc fault or a nuisance condition.

2. The apparatus of claim 1 further including a current sensor configured to monitor the power input, and to provide the signal associated with the power input to the input sense circuit.

3. The apparatus of claim 2 wherein the current sensor comprises a transformer including a primary coil having a primary coil winding and a secondary coil having a secondary coil winding, and wherein the primary coil winding is configured to surround the secondary coil winding to form a weak coupling between the respective coils.

4. The apparatus of claim 1 further including a power output and an electromechanical interface coupled between the power input and the power output, wherein the processor is further operative, if the at least one potential arcing event is indicative of an arc fault, to trip the electromechanical interface, thereby disconnecting the power output from a load coupleable thereto.

5. The apparatus of claim 4 wherein the electromechanical interface comprises a solenoid.

6. The apparatus of claim 1 wherein the amplifying sub-circuit comprises a comparator sub-circuit.

7. The apparatus of claim 1 wherein the accumulating sub-circuit comprises an integrating capacitor.

8. The apparatus of claim 1, wherein the accumulating sub-circuit comprises a digital counter.

9. The apparatus of claim 1 wherein the amplifying sub-circuit comprises a plurality of comparators, each comparator being configured to generate a respective pulse in the event the sensed signal exceeds a respective predetermined threshold, wherein the accumulating circuit comprises a digital counter, and wherein the processor is operative to receive the respective pulses generated by the plurality of comparators, and to increment the digital counter at different rates based on the received pulses.

10. The apparatus of claim 1 wherein the processor is operative to measure the accumulated signal a number of times over a set of cycles, to generate the first data representative of the accumulated signal measurements, .and to process the first data in accordance with an algorithm including, calculating a first measurement associated with a first cycle minus a second measurement associated with a second cycle to obtain a first calculated value, calculating a third measurement associated with a third cycle minus the second measurement associated with the second cycle to obtain a second calculated value, calculating the third measurement associated with the third cycle minus the first measurement associated with the first cycle to obtain a third calculated value, taking the absolute values of the first, second, and third calculated values, and calculating the first value plus the second value minus the third value to obtain a fourth calculated value.

11. The apparatus of claim 10 wherein the processor is further operative to repeat the processing of the first data in accordance with the algorithm using signal measurements corresponding to at least one different set of cycles, and to maintain a running sum of the fourth calculated values, the running sum being representative of the total amount of electrical arcing occurring during the predetermined time period.

12. The apparatus of claim 11 wherein the processor is further operative to process the second data in accordance with at least one second algorithm to count the number of arcing events included in the running sum.

13. The apparatus of claim 1 wherein the processor is operative to process the second data in accordance with an algorithm for counting the number of arcing events occurring during the predetermined time period.

14. The apparatus of claim 13 wherein the processor is further operative to capture timing information relating to the arcing events.

15. The apparatus of claim 1 wherein the power input is an AC power input.

16. The apparatus of claim 1 wherein the power input is a DC power input.

* * * * *